(12) United States Patent
Kruglick

(10) Patent No.: US 8,965,598 B2
(45) Date of Patent: Feb. 24, 2015

(54) AUTOMATIC FLIGHT CONTROL FOR UAV BASED SOLID MODELING

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 97 days.

(21) Appl. No.: 13/054,882

(22) PCT Filed: Sep. 30, 2010

(86) PCT No.: PCT/US2010/050829
§ 371 (c)(1),
(2), (4) Date: Aug. 12, 2013

(87) PCT Pub. No.: WO2012/044297
PCT Pub. Date: Apr. 5, 2012

(65) Prior Publication Data
US 2013/0317667 A1 Nov. 28, 2013

(51) Int. Cl.
*G05D 3/00* (2006.01)
*B64C 19/00* (2006.01)
(Continued)

(52) U.S. Cl.
CPC .............. *B64C 19/00* (2013.01); *B64C 39/024* (2013.01); *G05D 1/0094* (2013.01); *G05D 1/101* (2013.01); *G06T 17/05* (2013.01); *G06T 17/10* (2013.01); *B64C 2201/127* (2013.01); *B64C 2201/146* (2013.01)
USPC ...................... 701/2; 701/3; 701/13; 244/75.1

(58) Field of Classification Search
CPC .............. B64C 19/00; B64C 2201/127; B64C 2201/146; B64C 39/024; G05D 1/101; G06T 17/05
USPC ...................... 701/2, 3, 13, 24, 36, 31.4, 300; 244/75.1
See application file for complete search history.

(56) References Cited

U.S. PATENT DOCUMENTS 4,504,914 A 3/1985 Hofmann
4,613,899 A 9/1986 Kuwano et al.
(Continued)

FOREIGN PATENT DOCUMENTS

AU 2010219335 9/2010
EP 2112630 10/2009
(Continued)

OTHER PUBLICATIONS

International Preliminary Report on Patentability issued Apr. 2, 2013.
(Continued)

*Primary Examiner* — Gertrude Arthur Jeanglaude
(74) *Attorney, Agent, or Firm* — Turk IP Law, LLC

(57) ABSTRACT

Technologies are generally described for controlling a flight path of a UAV based image capture system for solid modeling. Upon determining an initial movement path based on an estimate of a structure to be modeled, images of the structure to be modeled may be captured and surface hypotheses formed for unobserved surfaces based on the captured images. A normal vector and a viewing cone may be computed for each hypothesized surface. A set of desired locations may be determined based on the viewing cones for the entire structure to be modeled and a least impact path for the UAV determined based on the desired locations and desired flight parameters.

21 Claims, 11 Drawing Sheets

(51) Int. Cl.
*B64C 39/02* (2006.01)
*G05D 1/00* (2006.01)
*G05D 1/10* (2006.01)
*G06T 17/05* (2011.01)
*G06T 17/10* (2006.01)

(56) References Cited

U.S. PATENT DOCUMENTS

| | | |
|---|---|---|
| 4,628,354 A | 12/1986 | Nagura |
| 4,802,757 A | 2/1989 | Pleitner et al. |
| 5,104,217 A | 4/1992 | Pleitner et al. |
| 5,289,185 A | 2/1994 | Ramier et al. |
| 5,602,586 A | 2/1997 | Schauer et al. |
| 6,272,404 B1 | 8/2001 | Amano et al. |
| 6,972,696 B2 | 12/2005 | Rogers et al. |
| 7,009,638 B2 | 3/2006 | Gruber et al. |
| 7,339,614 B2 | 3/2008 | Gruber et al. |
| 7,342,670 B2 | 3/2008 | Teichman |
| 7,509,241 B2 | 3/2009 | Gou et al. |
| 7,630,797 B2 | 12/2009 | Garceau et al. |
| 8,355,834 B2 * | 1/2013 | Duggan et al. ............ 701/24 |
| 8,768,555 B2 * | 7/2014 | Duggan et al. ............ 701/24 |
| 2003/0014224 A1 | 1/2003 | Guo et al. |
| 2008/0125920 A1 | 5/2008 | Miles et al. |
| 2009/0256909 A1 | 10/2009 | Nixon |
| 2009/0263009 A1 | 10/2009 | Krishnaswamy et al. |
| 2010/0004802 A1 | 1/2010 | Bodin et al. |
| 2010/0013927 A1 | 1/2010 | Nixon |

FOREIGN PATENT DOCUMENTS

| | | |
|---|---|---|
| WO | 2006/037237 | 4/2006 |
| WO | 2009/125304 | 10/2009 |

OTHER PUBLICATIONS

Punchcard VideoTrace, Modelling a House, http://punchcard.com.au/wordpress/?p=12.

Punchcard: VideoTrace, Image-based Modelling for All, http://tinyurl.com/y96q52c.

Andert, et al., Online World Modeling and Path Planning for an Unmanned Helicopter, Autonomous Robot (2009) 27: 147-164.

Metni et al., A UAV for Bridge Inspection: Visual Serving Control Law with Orientation Limits, Automation in Construction, vol. 17, #1, (2007) pp. 3-10.

Favi et al., Techniques for Fully Integrated Intra-/Inter-Chip Optical Communication, Proceedings of the 45th annual Design Automation Conference, Anaheim, California (2008) 2 pages.

Fischler et al., Random Sample Consensus: A Paradigm for Model Fitting with Applications to Image Analysis and Automated Cartography. Commun. ACM, 24(6):381-395, 1981.

Quirk et al., RANSAC-Assisted Display Model Reconstruction for Projective Display, Department of Computer Science University of North Carolina at Chapel Hill, 4 pages.

International Search Report & Written Opinion dated Jan. 4, 2011 in PCT/US10/050829.

* cited by examiner

AUTOMATIC FLIGHT CONTROL FOR UAV BASED SOLID MODELING

CROSS REFERENCE TO RELATED APPLICATIONS

This Application is the National Stage filing under 35 US.C. §371 of PCT Application Ser. No. PCT/US10/50829 filed on Sep. 30, 2010. The disclosure of the PCT Application is hereby incorporated by reference in its entirety.

BACKGROUND

Unless otherwise indicated herein, the materials described in this section are not prior art to the claims in this application and are not admitted to be prior art by inclusion in this section.

Airborne unmanned camera platforms based on Unmanned Aerial Vehicles (UAVs) have various law enforcement, firefighting, search and rescue, inspection, and television broadcast applications. By installing a wirelessly accessible camera (digital or analog) on a UAV that is remotely controlled, high cost and high maintenance manned aircraft (planes, helicopters) are no longer needed. In addition to reducing setup/operation cost and risk to humans, UAV based camera platforms enable safe operations where manned aircraft may not be able to go. For example, manned aircraft are typically not allowed to fly within about 500 ft. of the ground, while small UAVs are commonly limited to altitudes below about 500 ft. Thus UAVs have an inspection advantage. UAV based platforms also enable use of different types and quality of image capture equipment. Analog or digital cameras of various resolution capabilities may be installed on UAVs even between flights.

One example application of UAV based camera platforms is in the inspection industry. For pre- or post-construction inspections of large or small structures, a UAV based camera platform may be used eliminating the need for inspectors to climb on structures or otherwise placing themselves at risk. Moreover, natural impediments such as weather do not affect UAV operations as they would with humans. UAV operations are, however, subject to various limitations.

The present disclosure appreciates that there are numerous limitations with UAV based image capture systems. For example, power (fuel or electric) is typically limited. Noise and flight path restrictions due to regulatory regulations have to be considered in determining a flight path of the UAV. Furthermore, operation time and cost may increase if a UAV has to fly around a structure repeatedly to capture aspects of the structure not captured during earlier flights. With sophisticated flight control software and extensive training, UAV operations may be optimized, but given the trend to simplify UAVs and their controllers (e.g., smart phone based UAV controllers are becoming popular), complex control software and specialized training increase the cost and limit the use of such systems.

SUMMARY

The present disclosure describes an automatic unmanned aerial vehicle (UAV) flight control system for solid modeling. The system includes a UAV with an onboard camera and a controller capable of communicating with the UAV via wireless means. According to some examples, the controller may determine an initial movement path based on an estimate of a structure to be modeled, capture images of the structure to be modeled, form surface hypotheses for unobserved surfaces based on the captured images, determine missing surface information from the surface hypotheses, and determine a least impact path for the UAV based on the missing surface information and desired flight parameters.

The present disclosure also provides a method for controlling a flight path of a UAV based image capture system for solid modeling. The method may include determining an initial movement path based on an estimate of a structure to be modeled, capturing images of the structure to be modeled, forming surface hypotheses for unobserved surfaces based on the captured images, and computing a normal vector and a viewing cone for each hypothesized surface. According to other examples, the method may further include determining a set of desired locations based on the viewing cones for the entire structure to be modeled and determining a least impact path for the UAV based on the desired locations and desired flight parameters.

The present disclosure further describes a computer-readable storage medium having instructions stored thereon for controlling a flight path of an unmanned aerial vehicle (UAV) based image capture system for solid modeling. The examples may include determining an initial movement path based on an estimate of a structure to be modeled, capturing images of the structure to be modeled, and guiding the flight path. According to further examples, the flight path may be guided by forming surface hypotheses for unobserved surfaces based on the captured images, computing a normal vector and a viewing cone for each hypothesized surface, determining a set of desired locations based on the viewing cones for the entire structure to be modeled, and determining a least impact path for the UAV based on the desired locations and one or more of a total flight time, available UAV energy, a noise limitation, and/or a user defined restriction for the UAV.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
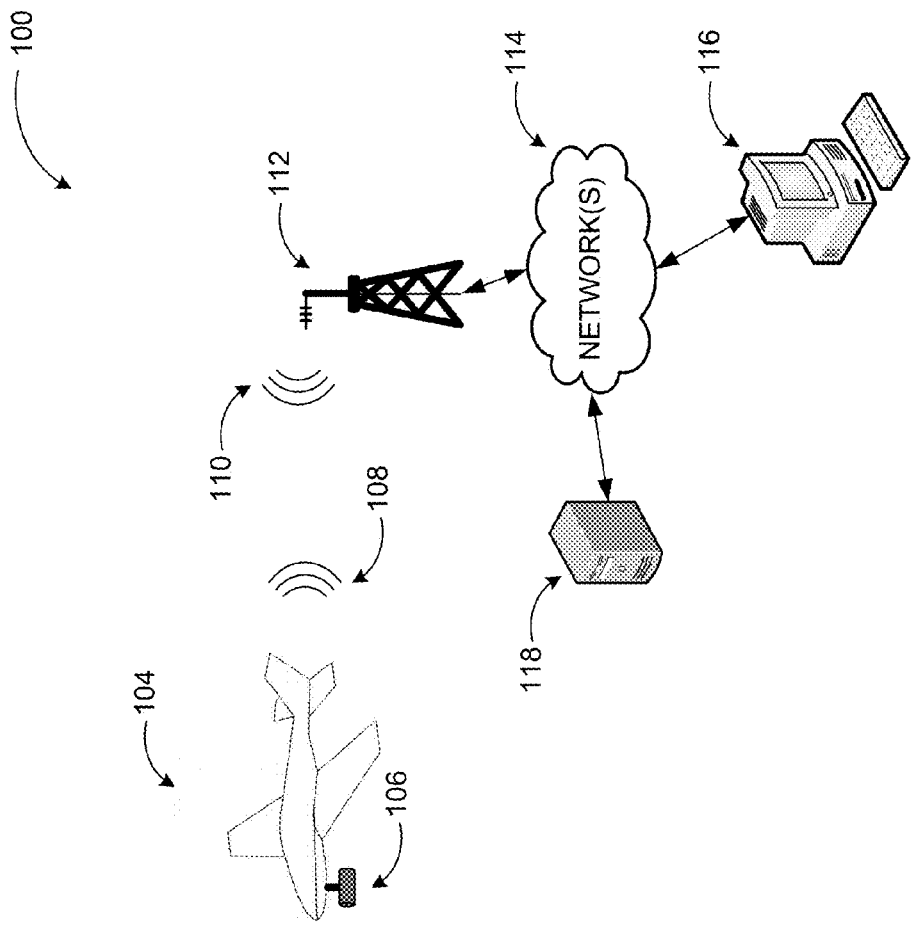
FIG. 1 illustrates an example Unmanned Aerial Vehicle (UAV) controlled by a remote control device capturing images of a structure, where flight path of the UAV may be determined based on solid modeling.
Figure 1:
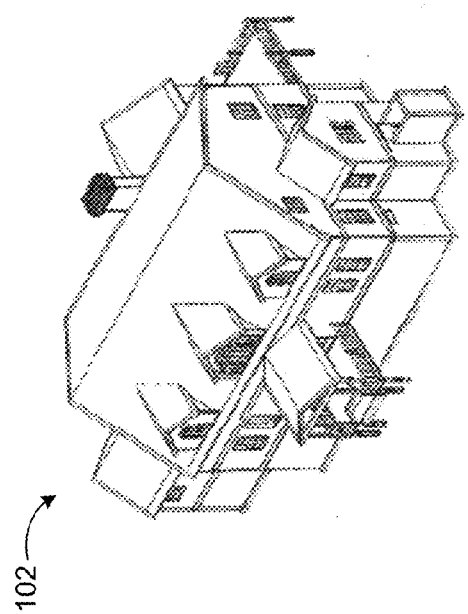

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to controlling the flight path of a UAV based on hypothesized surfaces and computed set of desired location associated with a structure to be observed by the UAV.

Briefly stated, a UAV based image capture system may be implemented on a computing device for control of a mobile remote camera to provide a path of images in order to facilitate generation of three dimensional (3D) models. While examples are described using unmanned aerial vehicles, embodiments may also be implemented with remote controlled land-based or marine-based vehicles. The flight path of a UAV may be controlled and dynamically modified path such that the UAV observes all the surfaces of a central object by receiving data on hypothesized surface normals and view cones of unobserved surfaces.

FIG. 1 illustrates an example Unmanned Aerial Vehicle (UAV) controlled by a remote control device capturing images of a structure, where flight path of the UAV may be determined based on solid modeling in accordance with at least some embodiments.

A UAV based image capturing system such as the one shown in diagram 100 may be used to capture images and/or model natural or manmade structures like houses, schools, office buildings, etc. In diagram 100, the example system includes a UAV 104 with an onboard camera 106 flying over a structure 102 and capturing its images from various angles. A flight path of the UAV 104 may be controlled and captured images downloaded to an image processing program executed on a remote computing device 116 or a server 118. Communication between the UAV 104 and the remote computing device 116 may be facilitated through wireless communications. For example, the remote computing device 116 may communicate with a wireless tower 112 through a network 114. The wireless tower 112 may send flight path control commands 110 (and/or image capture control commands) to the UAV 104 and receive responses 108 (captured images, responses to flight path control commands, telemetry data, etc.).

The remote computing device 116 may be a desktop computer, a laptop computer, a vehicle mount computer, a handheld computer, a smart phone, a server, or any comparable computing device. The remote computing device 116 may execute a flight control program and an image processing program as part of an integrated application or service. Alternatively, the remote computing device 116 may execute one or both of two separate applications: one for flight path control, the other for image processing. Using captured images to determine unobserved surfaces of the structure 102, the remote computing device 116 may determine a set of desired locations for the UAV's flight path to include, and determine the flight path based on the desired locations and flight parameters for the UAV such as fuel use, noise, and similar restrictions. The new flight path may be sent to the UAV and adjusted dynamically as new images are captured.

Figure 2:
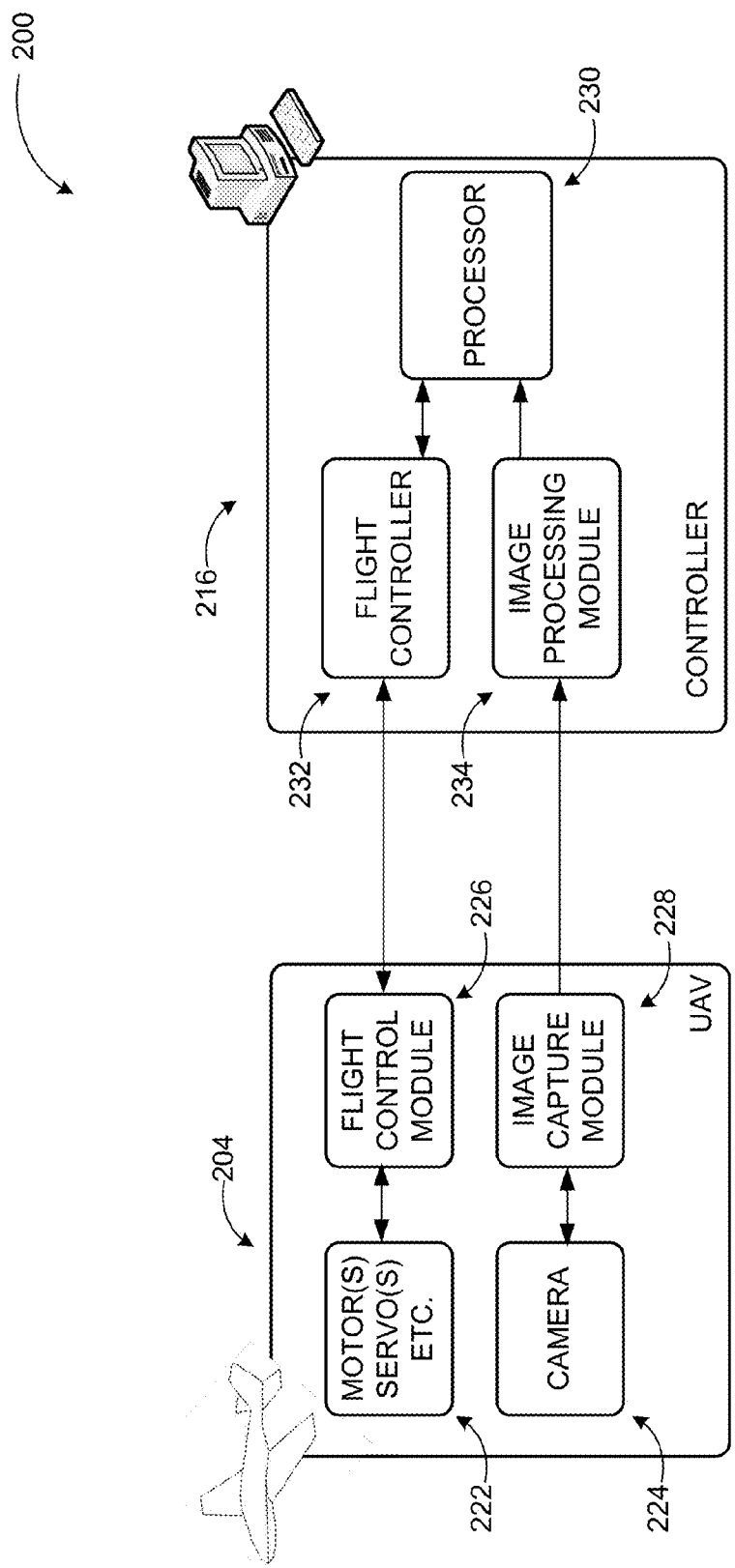
FIG. 2 illustrates example major functional components in a UAV and its remote control device in an automatic flight control system.

FIG. 2 illustrates example major functional components in a UAV and its remote control device in an automatic flight control system arranged in accordance with at least some embodiments. A UAV based image capture system with dynamic adjustment of flight path based on analysis of captured images may be implemented by distinct or integrated software and/or hardware modules. The modules may be included in one or more computing devices (e.g., a server executing the image processing operations and a handheld device executing the flight control computations communicatively coupled over one or more networks). The system illustrated in diagram 200 is an example system. Embodiments may be implemented with fewer or additional modules and hardware configurations.

In the example system, a UAV 204 may include mechanical and electronic flight control mechanisms 222 such as motor(s), servo(s), fuel control switches, etc. associated with various flight operations of the UAV 204. An onboard flight control module 226 may receive flight control instructions from a remote computing device 216, control relevant flight control mechanisms, and provide feedback information (e.g., telemetry information) to the remote computing device 216.

The UAV 204 may further include an onboard camera 224 coupled to an image capture module 228. The image capture module 228 may simply transmit captured images to the remote computing device 216, store the captured images, and/or process the captured images depending on a complexity and configuration of the system. The image capture module 228 may also be used to adjust operational parameters, such as resolution, of the onboard camera 224.

The remote computing device 216 may include a flight control module 232 for processing received feedback from the UAV and providing flight control instructions to the UAV to dynamically adjust its flight operations. An image processing module 234 may receive captured images from the image capture module 228, process the images, and provide information to a processor 230 such that the flight path of the UAV can be dynamically adjusted based on observed surfaces of a structure (or object) in order to cover unobserved surfaces. According to some embodiments, the processor 230 may hypothesize surface normals and view cones of unobserved surfaces based on the observed surfaces and determine a set of desired locations to be included in the UAV's flight path. The processor 230 may then determine a new (or adjusted) flight path based on a comparison of desired flight parameters (e.g., restrictions such as available fuel, altitude, noise levels, etc.) and the desired locations.

Figure 3:
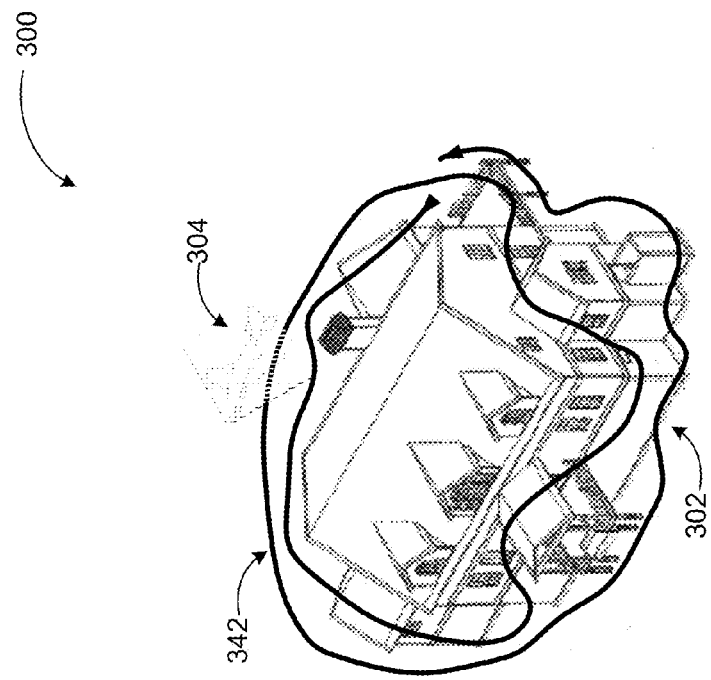
FIG. 3 illustrates two example flight paths for a UAV, a predefined one and another one based on least impact path and solid modeling techniques.
Figure 3:
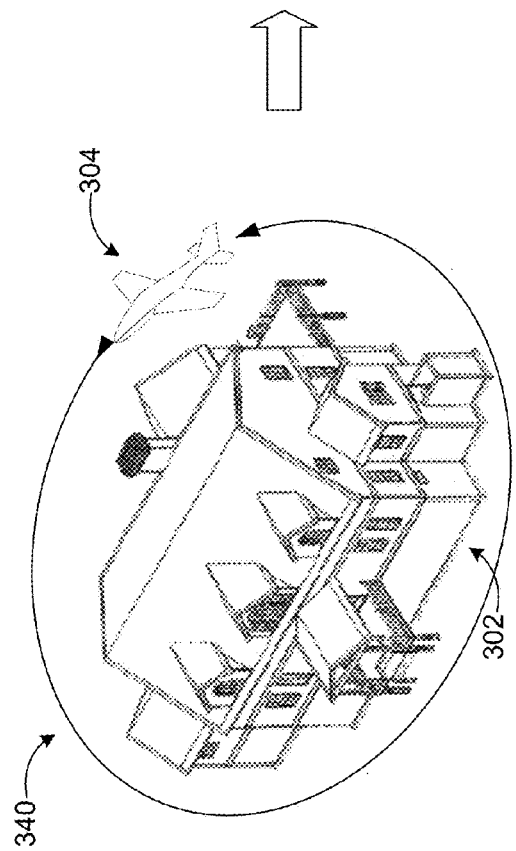

FIG. 3 illustrates two example flight paths for a UAV, a predefined one and another one based on least impact path and solid modeling techniques in accordance with at least some embodiments. Without dynamic adjustment to cover unobserved surfaces, the flight path of a UAV may result in insufficient images of the structure to be observed. As shown in diagram 300, a predefined flight path 340 for a UAV 304 may be rather simple, but the camera may not be able to capture details of various portions of a structure 302 such as depth of windows, sub-deck portions, etc. Even if the flight path is made relatively more complicated around the structure, dynamic conditions such as lighting may affect how well different portions of the structure can be observed. Thus, observation quality may be sacrificed if a predefined flight path is used. This in return may result in low quality modeling of the structure. For example, engineers attempting to model a complicated structure for assessment may not be able to capture details of certain three dimensional features.

In a system according to embodiments, a flight path 342 of the UAV 304 may be dynamically adjusted by hypothesizing surface normals and view cones of unobserved surfaces based on the observed surfaces and determining a set of desired locations to be included in the UAV's flight path. An optimization algorithm such as branch and bound optimization, Newton's method, simulated annealing algorithm, differential evolution, and similar computations may be employed to reduce overlaps and repeat flights around the structure to conserve fuel, reduce operation time, or enhance other flight related parameters. Additional optimization algorithms are discussed below in conjunction with FIG. 7.

Figure 4:
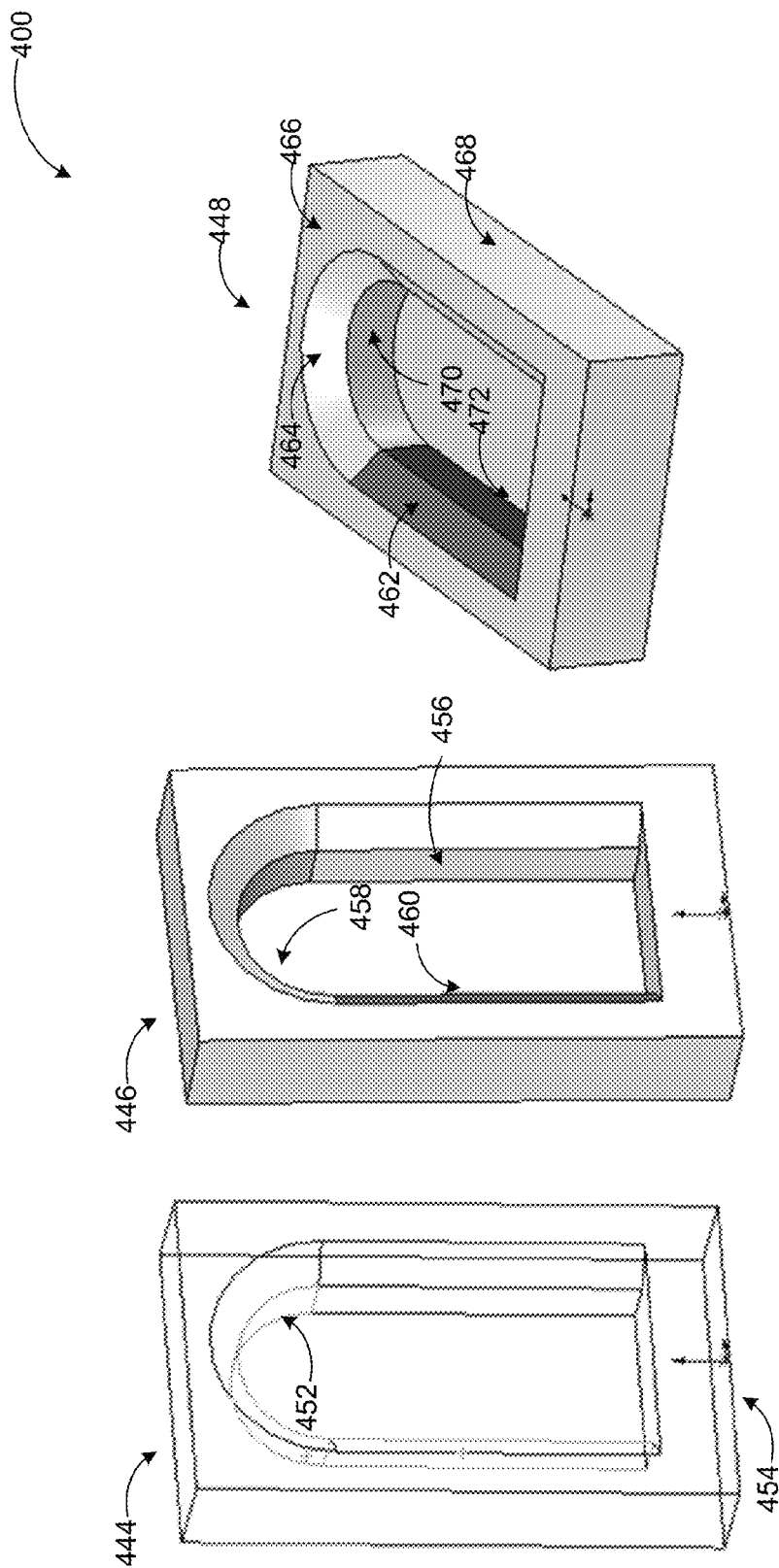
FIG. 4 illustrates an example surface confidence determination for UAV navigation computation.

FIG. 4 illustrates an example surface confidence determination for UAV navigation computation in accordance with at least some embodiments. A number of different approaches may be employed to determine desired locations for the UAV's flight path in order to cover unobserved surfaces. This is typically done based on information from observed surfaces. The three dimensional figures in diagram 400 illustrate outputs of an example algorithm that may be used to compute surface confidence, which is then used to determine desired locations for UAV flight path.

RANSAC is the abbreviation for "Random Sample Consensus", which is used for taking a point cloud and fitting hypothetical surfaces to the point cloud. The overall approach may be described as generating a surface that minimizes the least squares difference from the surface to a point cloud while satisfying various assumptions. The assumptions may include an expectation of planarity and linear features (common for architecture), recognition of symmetry (as in diagram 400), and comparable ones, which are likely to continue into unobserved areas when not precluded by the data. In order to enable the dynamic navigation for enhanced observation, surfaces that are in some way deficient may be identified and the flight path altered such that more data on those surfaces can be collected.

Representations 444, 446, and 448 of a 3D architectural structure in diagram 400 may be obtained as an output of a RANSAC surface extractor program. In the representations 444, 446, and 448, surfaces of the same architectural structure are hypothesized from multiple views (e.g., from video capture) and the structure shown in various rotated positions to illustrate the surfaces where surface image data has not been taken (hypothesized but unobserved surfaces). A volume and views, which the camera platform needs to obtain in order to complete a model for the structure, may be determined based on the normals and view angles computed from the hypothesized surfaces.

The representations 444 and 446 are views based on images captured during a first camera pass. In addition to computing a best geometry, a confidence number may be generated for each surface segment (shown in different shades of grey) in the synthetic image representation 448 to indicate the number of points that are collected. According to other embodiments, a suitable confidence computation for UAV navigation may capture areas where more data is needed instead of a least squares matching for confidence. According to an example scenario, the surface confidence may be computed as the sum of the area proportion with point density below average and the ratio of the surface mean error to the surface mean error on surfaces closest to normal with the measured view. Thus, both the quality of the points and the proportion of the surface that has not been observed may be used in determining surface confidence by a system according to at least some embodiments.

The representation 444 illustrates two example areas of the structure (inner curve 452 and bottom surface 454), which are not observed during the first pass (hidden from the view). The representation 446 illustrates more areas (458, 460, and 456), which are shown in various shades of grey indicating respective confidence levels in those surfaces (with darker shades representing lower confidence). The representation 448 of the generated image illustrates different surfaces of the structure with confidence numbers computed and symbolized by shades of grey (again with darker shades representing lower confidence).

Figure 5:
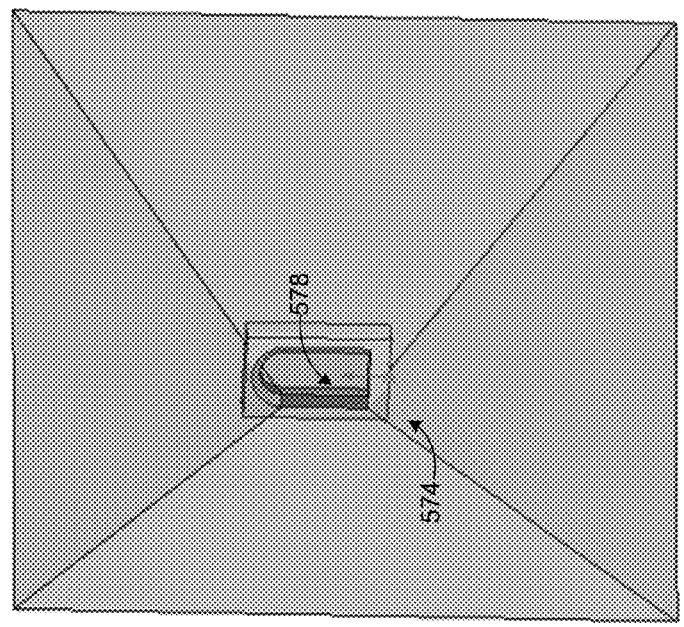
FIG. 5 illustrates surface normal cones from a low quality surface to be used in surface confidence computation.
Figure 5:
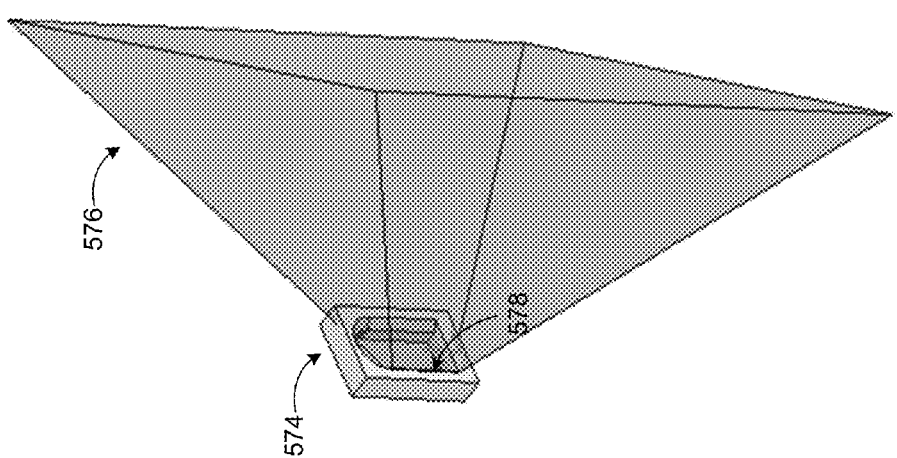

FIG. 5 illustrates surface normal cones from a low quality surface to be used in surface confidence computation in accordance with at least some embodiments. In diagram 500, the architectural structure of FIG. 4 is used to illustrate how surface normal cones may be computed to determine desired locations for the UAV. While such locations may be distinct, a continuous set of locations may also be computed using a "goodness gradient" as described below.

Diagram 500 includes two views of a surface normal cone 576 from a low quality surface 578 on an architectural structure 574. The left figure is a broad view and the right figure is from a perspective inside the cone facing the low quality surface 578 (shown as 462 in the previous figure). A single cone is shown in diagram 500 for clarity. The cone 576 is a draft extension generated from a vector normal from the low quality surface 578 with a defined view angle. The view angle for each system may be calculated based on the optical attributes of the capturing camera and a distance of the UAV to the structure so as to yield an estimated point density which provides a desired surface quality or resolution. For example, the angle may be selected to be a narrow angle for an inspection application and a wide angle for a general object mapping application. According to other embodiments, the angle may be computed as a goodness gradient determined dynamically by optical resolution, distance, lighting conditions, and/or similar parameters such that the path for the UAV can maximize the "goodness" of the path (i.e., highest quality observation for optimum flight parameters).

Figure 6:
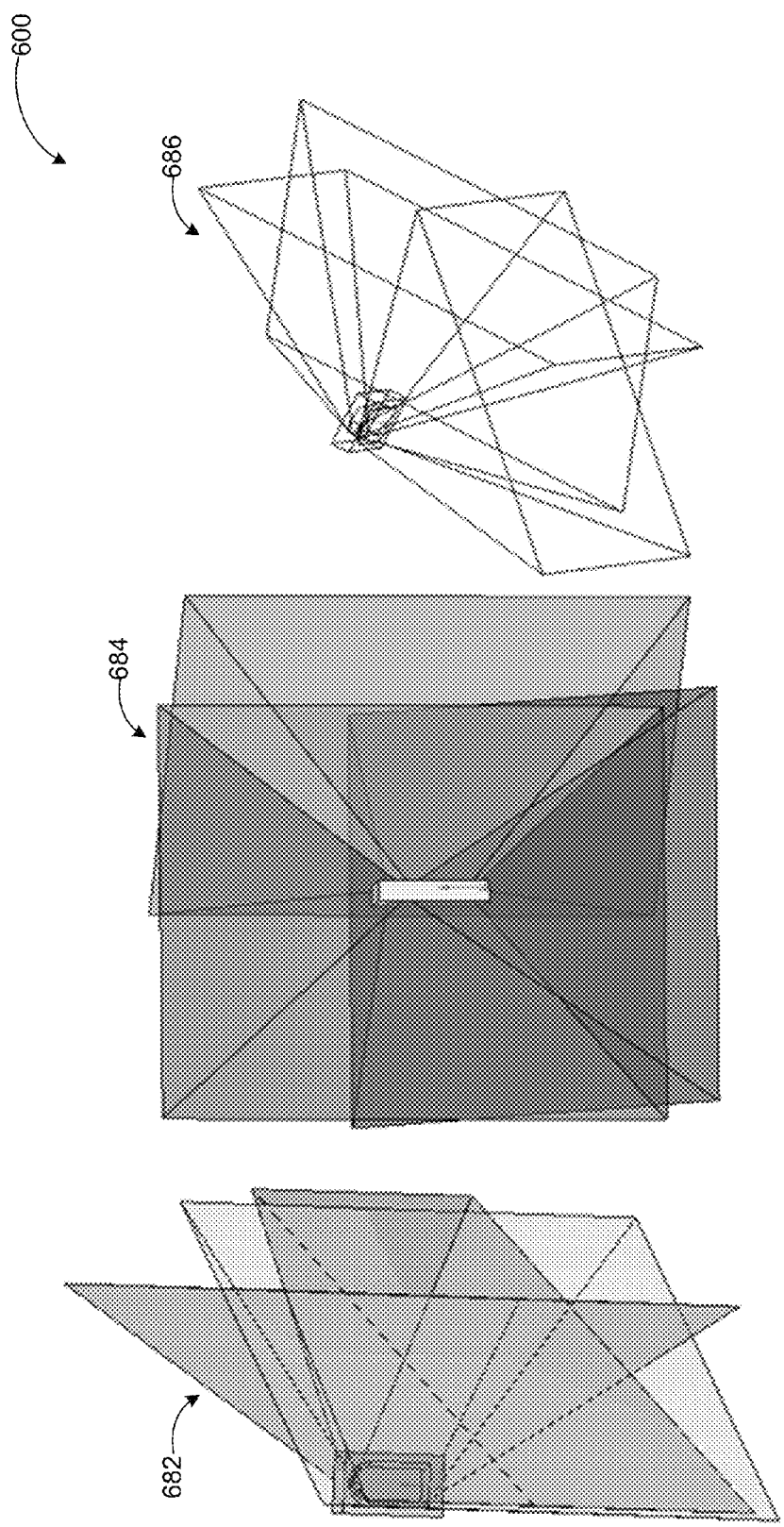
FIG. 6 illustrates surface normal cones from unobserved and low quality surfaces to be used in surface confidence computation.

FIG. 6 illustrates surface normal cones from unobserved and low quality surfaces (e.g., surfaces 458, 462, 472, and the left half of 470—which may be considered a different polygon than 470—of FIG. 4) to be used in surface confidence computation in accordance with at least some embodiments. Diagram 600 includes three views of multiple surface normal cones associated with the architectural structure 574 of FIG. 5.

In each of the views 682, 684, and 686, the surface normal cones from each unobserved or otherwise low quality area are extended from a vector normal of a different low quality surface. The surface normal cones may be computed using the average normal from the lowest quality data. For non-planar surfaces, the computation may be performed by breaking down the surfaces that were previously identified as low quality from a single score into a Voronoi tessellation (e.g., polygonal Voronoi cells, each cell including points closer to a selected point on the surface than to any other site) and giving each region a similar score and then using the largest area in the Voronoi diagram with a score below the threshold as the surface for normal generation (e.g., generation of the cone from the left half of surface 470 in FIG. 4). The segments of the Voronoi diagram are the points in the plane that are equidistant to the two nearest sites. Then, each normal may be extended and the corresponding cone defined based on the imaging metrics discussed above.

In some embodiments, flight path adjustment computation in a system may be segmented into two sections: determination of desired locations and determination of new/adjusted path based on the desired locations and flight parameters. Determination of the desired locations may be achieved by employing some of the above described approaches or other approaches using the principles described herein such as six-degrees-of-freedom model.

Figure 7:
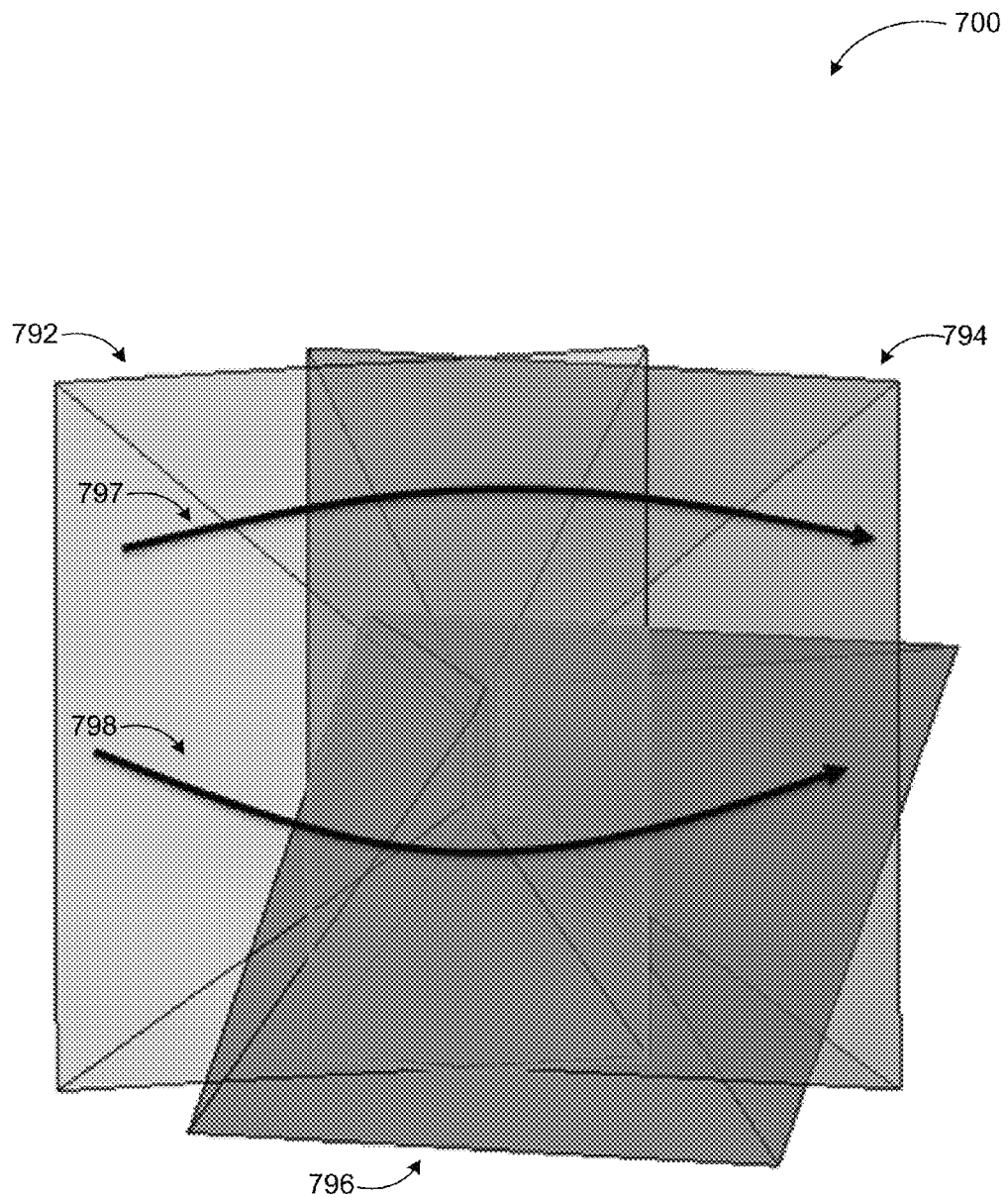
FIG. 7 illustrates an example flight path selection for obtaining data on low data areas based on surface normal cones for unobserved and/or low quality surfaces.

FIG. 7 illustrates an example flight path selection for obtaining data on low data areas based on surface normal cones for unobserved and/or low quality surfaces in accordance with at least some embodiments. Once desired locations are determined, a flight control processing system may compute a new/adjusted flight path based on the desired locations and one or more predefined or dynamic flight parameters such as available fuel, available time, noise considerations, altitude or radius limitations, camera capabilities, or similar aspects.

The selection of desired locations for imaging is based on finding locations which generate as much data on as many missing surfaces as possible. As discussed above, this may be considered maximizing the achieved "goodness". For example, each surface normal cone may have a uniform goodness, and the goodness value for each cone may be defined as a poor quality score. Thus, the goodness is maximized when gathering data for areas with the most uncertainty. If a flight parameter such as power or time limits the possibility of visiting all desired locations for data collection, a new path may be selected based on ranking locations according to their poor quality scores. For example the space shown in diagram 700 may be combined with the flight parameters (or flight cost values) resulting in a multidimensional optimization. The optimization may be constructed through various means described herein and becomes an M-dimensional optimization of values.

In particular, the goodness and cost functions (flight parameters) are typically well behaved and optimization approaches such as lazy optimization, matrix-chain multiplication, Gauss-Newton algorithm, and/or simulated annealing optimization may be employed. If a more complex goodness function is employed, the optimization may yield many local maxima resulting in additional computational complexity. Thus, a simpler uniform goodness function may be adopted, although more complex ones can certainly be computed employing more powerful processing systems. The goodness from each region may be earned once per travel path. Thus, the summation for any path cannot obtain additional information from traversing an overlap area if it also traverses the areas that form the overlap.

Diagram 700 illustrates an example of selecting between two different paths 797 and 798 that a UAV might fly to gather more data on the low data areas. The top path 797 only traverses surface normal cones 792 and 794 extended from an architectural structure. On the other hand, the bottom path 798 traverses all three surface normal cones 798, 794, and 796. Thus, the bottom path 798 results in more data collection associated with the low quality surfaces of the structure. The bottom path 798, however, may require changes in altitude and may have additional optimization costs (such as an undesirable closeness to the ground). The goodness values and cost functions may define whether the additional data is worth the added cost and aid in selection of the path to be taken by the UAV. Thus, desired viewpoints may be used to generate a set of desired travel waypoints and the minimal cost or least impact navigation optimization may select a path through those desired waypoints.

Figure 8:
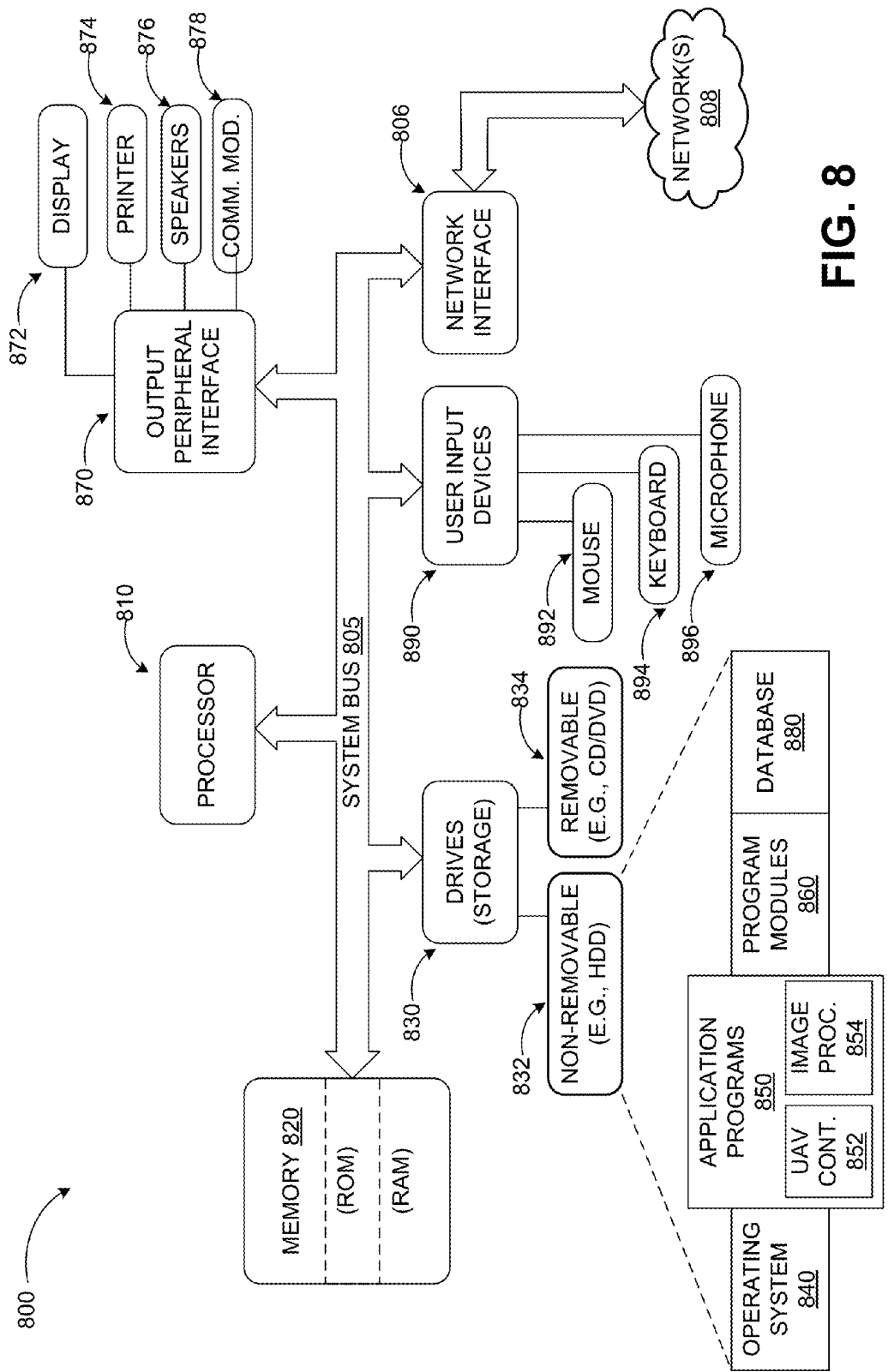
FIG. 8 illustrates a general purpose computing device, which may be used to determine navigational path(s) for a UAV capturing surface images for solid modeling.

FIG. 8 illustrates a general purpose computing device, which may be used to determine navigational path(s) for a UAV capturing surface images for solid modeling in accordance with at least some embodiments.

As depicted, a computer 800 includes a processor 810, a memory 820, and one or more drives 830. The drives 830 and their associated computer storage media such as removable storage media 834 (e.g., CD-ROM, DVD-ROM) and non-removable storage media 832 (e.g., a hard drive disk), may provide storage of computer readable instructions, data structures, program modules and other data for the computer 800. The drives 830 may include an operating system 840, application programs 850, program modules 860, and a database 880. The computer 800 further may include user input devices 890 through which a user may enter commands and data. The input devices 890 may include an electronic digitizer, a microphone 896, a keyboard 894, and a pointing device such as a mouse device 892, trackball device or touch pad device. Other input devices may include a joystick device, game pad device, satellite dish, scanner device, or the like.

The application programs 850 may include a UAV control application 852 and an image processing application 854. The UAV control application 852 may define an initial flight path for the UAV and compute adjustments for the flight path for optimization based on predefined flight parameters and desired locations for enhancing captured images and solid modeling of a structure to be captured by the UAV.

The above described and other input devices may be coupled to the processor 810 through a user input interface that is coupled to a system bus 805, but may be coupled by other interface and bus structures, such as a parallel port, game port or a universal serial bus (USB). Computers such as the computer 800 may also include other peripheral output devices such as speakers 876, a printer 874, a display 872, and a communication module 878, which may be coupled through an output peripheral interface 870 or the like. The communication module 878 may be used to communicate through wired or wireless means with one or more UAVs.

The memory 820, removable storage devices 834 and non-removable storage devices 832 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computer 800. Any such computer storage media may be part of the computer 800.

The computer 800 may operate in a networked environment using logical connections to one or more computers, such as a remote computer connected to a network interface 806. The remote computer may be a personal computer, a server, a router, a network PC, a peer device or other common network node, and can include many or all of the elements described above relative to the computer 800. Networking environments are commonplace in offices, enterprise-wide area networks (WAN), local area networks (LAN), intranets and world-wide networks such as the Internet. For example, in the subject matter of the present application, the computer 800 may include UAV flight path control modules and the remote computer may include image processing modules. It should be noted, however, that source and destination machines need not be coupled together by a network(s) 808 or any other means, but instead, data may be migrated via any media capable of being written by the source platform and read by the destination platform or platforms. When used in a LAN or WLAN networking environment, the computer 800 may be coupled to the LAN through the network interface 806 or an adapter.

The network(s) may comprise any topology employing servers, clients, switches, routers, modems, Internet service providers (ISPs), and any appropriate communication media (e.g., wired or wireless communications). A system according to some embodiments may have a static or dynamic network topology. The network(s) may include a secure network such as an enterprise network (e.g., a LAN, WAN, or WLAN), an unsecure network such as a wireless open network (e.g., IEEE 802.11 wireless networks), or a world-wide network such (e.g., the Internet). The network(s) may also comprise a plurality of distinct networks that are adapted to operate together. The network(s) are adapted to provide communication between the nodes described herein. By way of example, and not limitation, the network(s) may include wireless media such as acoustic, RF, infrared and other wireless media.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computer 800 may be implemented as a portion of a small-form factor portable (or mobile) electronic device such as a portable computing device, a mobile computing device, an application specific device, or a hybrid device that include any of the above functions. The computer 800 may also be implemented as a personal computer including both laptop computer and non-laptop computer configurations. Moreover, the computer 800 may be implemented as a networked system or as part of a general purpose or specialized server.

Figure 9:
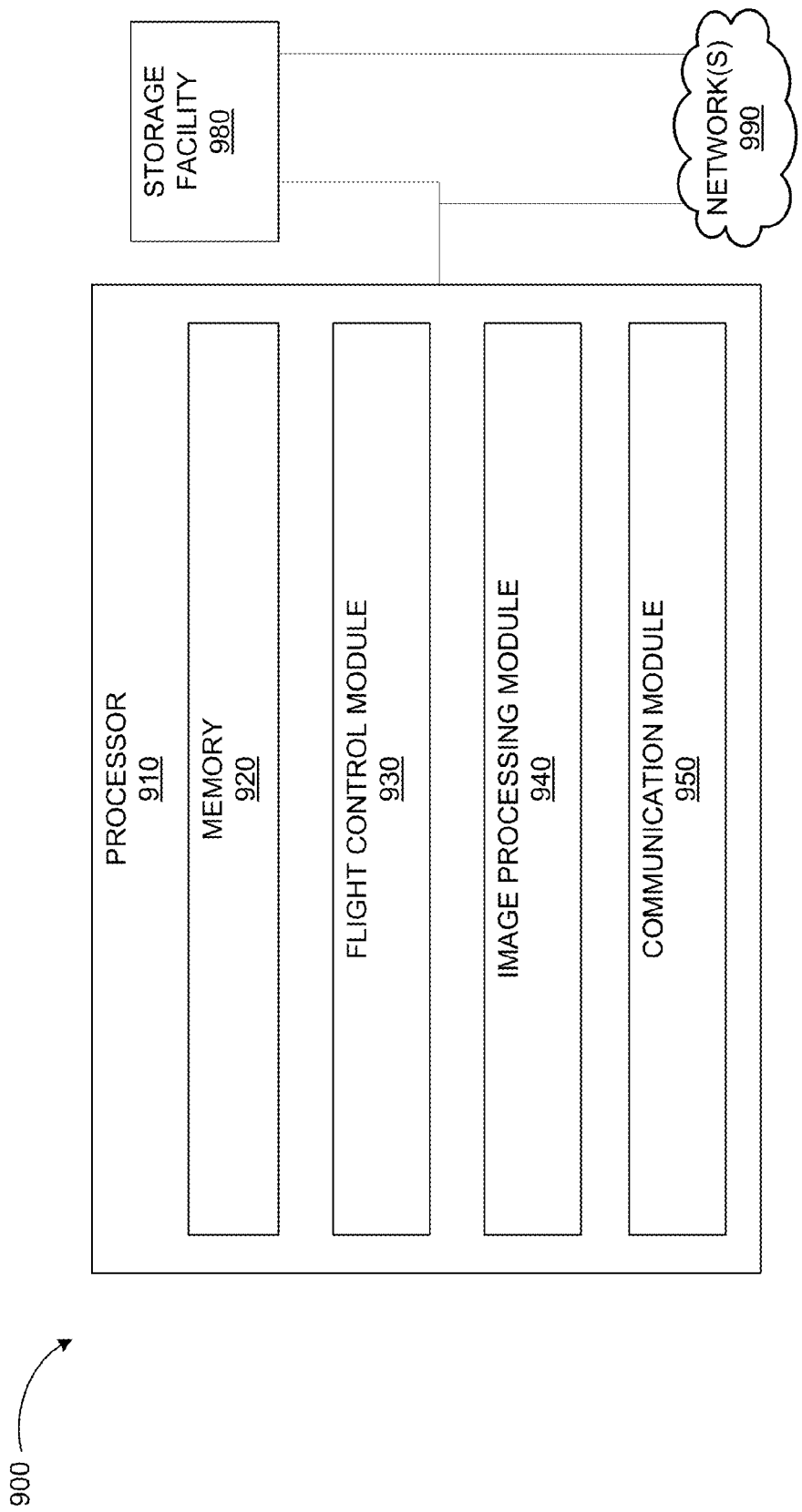
FIG. 9 illustrates a processor, which may be used to determine navigational path(s) for a UAV capturing surface images for solid modeling.

FIG. 9 illustrates a processor 910, which may be used to determine navigational path(s) for a UAV capturing surface images for solid modeling in accordance with at least some embodiments. The processor 910 of diagram 900 may be part of a remote computing device or mobile UAV controller communicatively coupled to one or more modules responsible for computing UAV flight path, processing captured images from the UAV, etc. According to some embodiments, processor 910 may also be as part of a computing system on board the UAV.

The processor 910 may include a number of modules for controlling different aspects of UAV based imaging. The modules may include a flight control module 930 for determining optimum flight path for a UAV based on solid modeling of structures observed by the UAV, an image processing module 940 for processing images captured by the UAV and/or modeling structures based on captured images, and a communication module 950 for facilitating communications between the processor 910 and the UAV's own flight control and image capture systems.

A memory 920 may be configured to store instructions for the control modules of the processor 910, which may be implemented as hardware, software, or combination of hardware and software. The processor 910 may communicate through direct electrical coupling or through networked communications (e.g., network(s) 990) with other computing devices and/or data stores such as a storage facility 980.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 10:
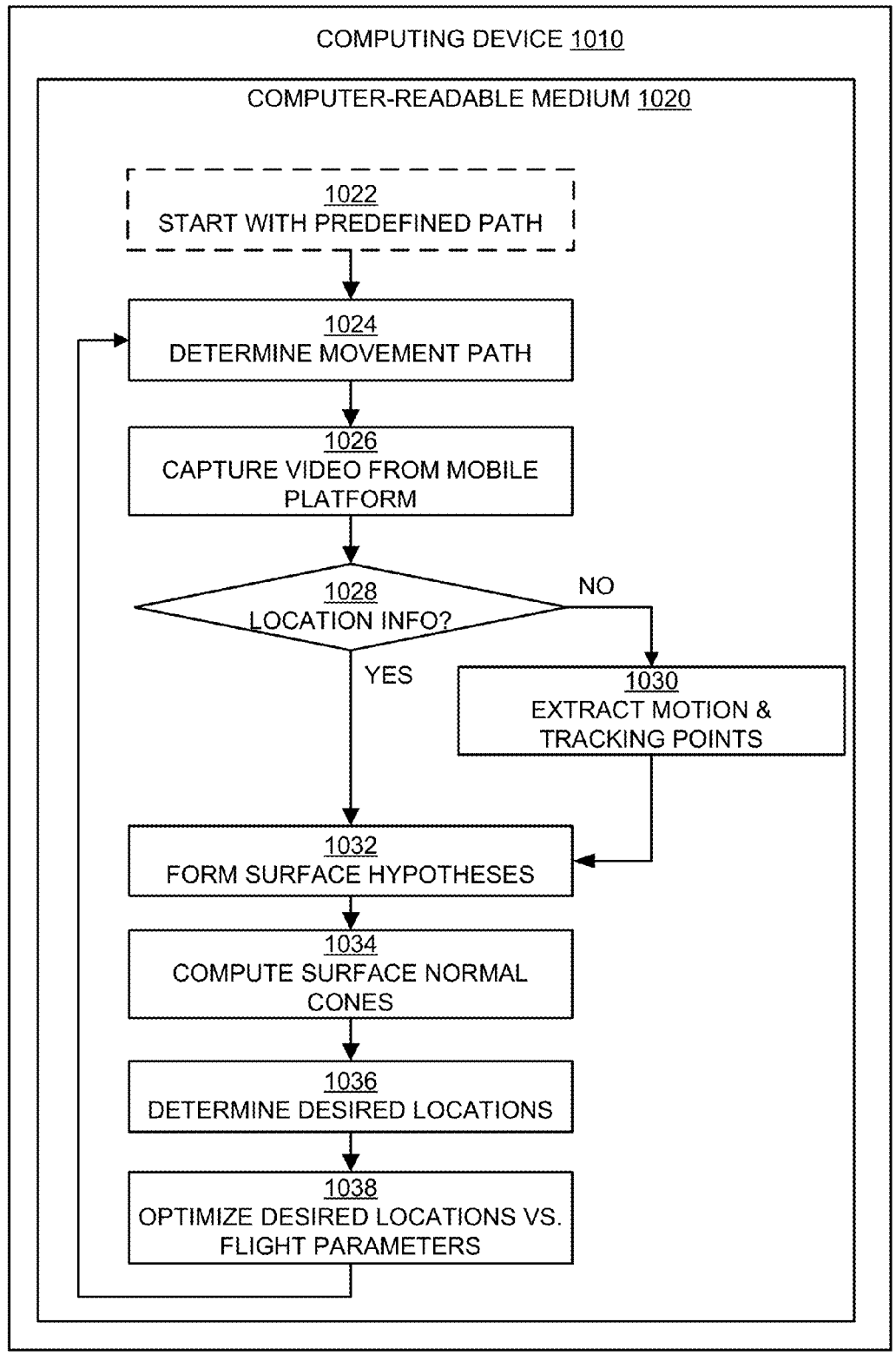
FIG. 10 is a flow diagram illustrating an example method that may be performed by a computing device, such as computer 800 in FIG. 8 or special purpose processor 910 in FIG. 9.

FIG. 10 is a flow diagram illustrating an example method that may be performed by a computing device, such as computer 800 in FIG. 8 or special purpose processor 910 in FIG. 9 in accordance with at least some embodiments. The operations described in blocks 1022 through 1038 may be stored as computer-executable instructions in a computer-readable medium such as drives 840 of the computer 800 or the memory 920 of the processor 910.

A process of controlling a UAV's flight path based on modeling of a structure observed by the UAV may begin with optional operation 1022, "START WITH PREDEFINED PATH." At operation 1022, the UAV may be started with a predefined path, for example, by assuming flying in a circle facing the structure at about the top of the structure to capture a majority of the surfaces. Thus, the camera may estimate from the first few frames a distance and a rough diameter of the structure (object) being scanned, and the UAV may rise to a point that appears to allow visibility past the structure to find the top.

At operation 1024, "DETERMINE MOVEMENT PATH", a three dimensional vector path may be adopted incorporating some level of movement dynamics of the mobile platform to prevent unsuitable maneuvering. Path computation and optimization may be continuously adjusted based on the computations in subsequent operations.

At operation 1026, "CAPTURE VIDEO FROM MOBILE PLATFORM", images of the structure are captured and processed during the initial predefined path. If location information is not directly obtainable from the captured images, a video tracker or similar algorithm may be executed and motion and tracking points may be extracted from the images at operation 1030, "EXTRACT MOTION & TRACKING POINTS". Following operation 1032 or receipt of location information from the images directly (decision operation 1028, "LOCATION INFO?"), surface hypotheses may be formed at operation 1032, "FORM SURFACE HYPOTHESES". The missing or hypothetical surfaces are those unobserved or without adequate data during the initial pass of the UAV. A degree of geometry may be developed based on knowledge of where a missing surface cannot be and assumptions based on other elements of the model such as symmetry or surface continuation.

At operation 1034, "COMPUTE SURFACE NORMAL CONES", a normal vector and a viewing cone may be developed for each hypothetical surface based on the other surfaces. The surface normal cones may be used to determine a set of desired locations and view angles that the vehicle would need to occupy to observe the hypothetical surfaces at operation 1036, "DETERMINE DESIRED LOCATIONS". If the UAV reaches this space and does not observe the surface, the hypothetical surface direction may be changed and a new space provided to explore or the missing surface.

At operation 1038, "OPTIMIZE DESIRED LOCATIONS VS. FLIGHT PARAMETERS", flight parameters such as power availability, time limitations, altitude or range limitations, noise requirements, etc. may be defined as cost functions and a multidimensional optimization performed to arrive at an optimum path for the UAV based on the desired locations and the cost functions. One example of the optimization is least impact path modification covering as many missing surface normal cones as possible. According to other embodiments, surface normal cones may be assigned confidence scores and the optimization performed with a goal of maximizing (or minimizing) the confidence score.

The operations included in the above described process are for illustration purposes. Automatic flight path control for UAV based solid modeling may be implemented by similar processes with fewer or additional operations. In some examples, the operations may be performed in a different order. In some other examples, various operations may be eliminated. In still other examples, various operations may be divided into additional operations, or combined together into fewer operations.

Figure 11:
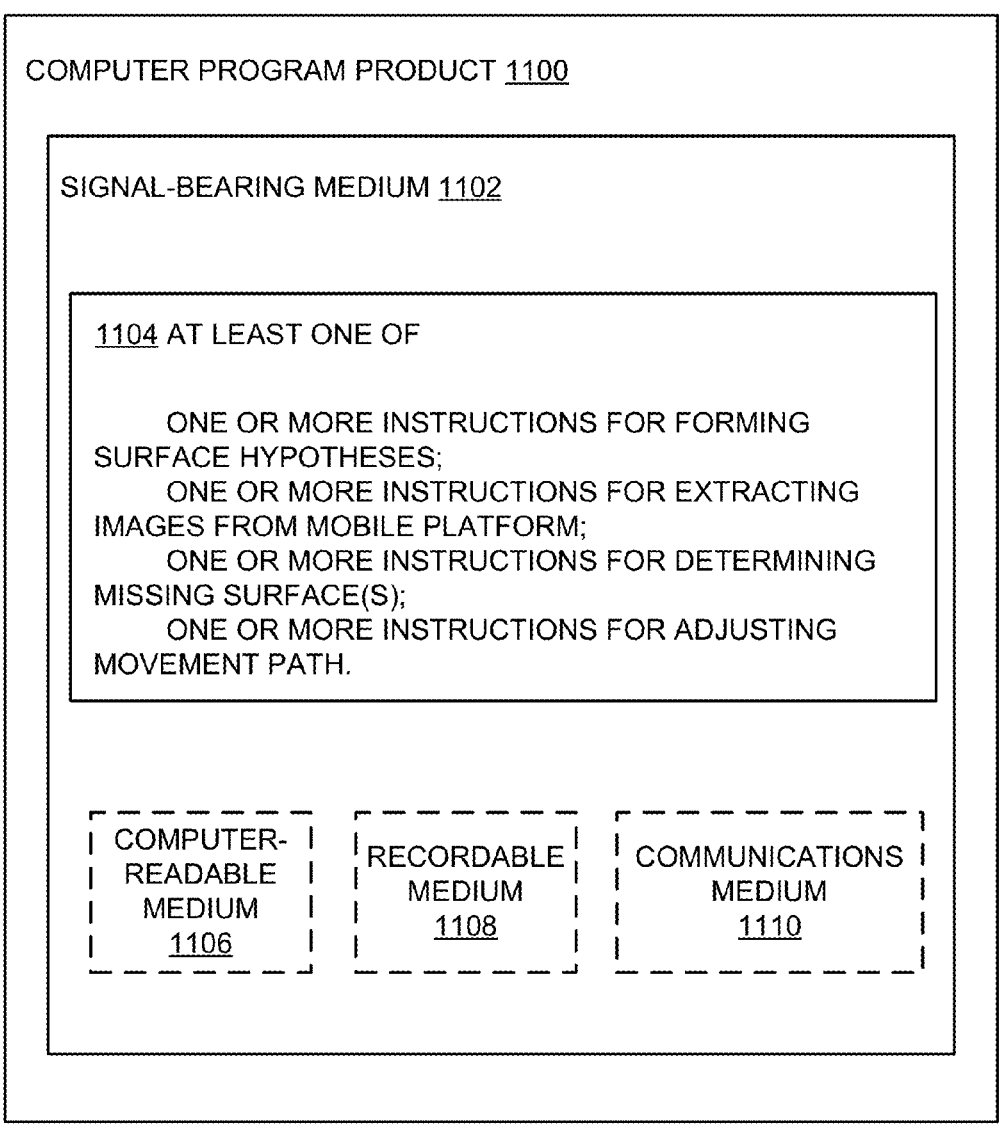
FIG. 11 illustrates a block diagram of an example computer program product; all arranged in accordance with at least some embodiments described herein.

FIG. 11 illustrates a block diagram of an example computer program product 1100 arranged in accordance with at least some embodiments described herein. In some examples, as shown in FIG. 11, the computer program product 1100 may include a signal bearing medium 1102 that may also include machine readable instructions 1104 that, when executed by, for example, a processor, may provide the functionality described above with respect to FIG. 8 and FIG. 9. Thus, for example, referring to the processor 910, the modules 930 and 940 may undertake one or more of the tasks shown in FIG. 11 in response to the instructions 1104 conveyed to the processor 910 by the medium 1102 to perform actions associated with controlling a UAV flight path as described herein. Some of those instructions may include forming surface hypotheses, extracting images from a mobile platform, determining missing surfaces, and/or adjusting the UAV's movement path.

In some implementations, the signal bearing medium 1102 depicted in FIG. 11 may encompass a computer-readable medium 1106, such as, but not limited to, a hard disk drive, a Compact Disc (CD), a Digital Video Disk (DVD), a digital tape, memory, etc. In some implementations, signal bearing medium 1102 may encompass a recordable medium 1108, such as, but not limited to, memory, read/write (R/W) CDs, R/W DVDs, etc. In some implementations, the signal bearing medium 1102 may encompass a communications medium 1110, such as, but not limited to, a digital and/or an analog communication medium (e.g., a fiber optic cable, a waveguide, a wired communications link, a wireless communication link, etc.). Thus, for example, the program product 1100 may be conveyed to one or more modules of the processor 910 by an RF signal bearing medium 1102, where the signal bearing medium 1102 is conveyed by a wireless communications medium 1110 (e.g., a wireless communications medium conforming with the IEEE 802.11 standard).

The present disclosure presents an automatic unmanned aerial vehicle (UAV) flight control system for solid modeling. The system includes a UAV 104 with an onboard camera 106 and a controller 116 capable of communicating with the UAV 104 via wireless means. According to some examples, the controller may determine an initial movement path 1024 based on an estimate of a structure to be modeled, capture images of the structure to be modeled 1026, form surface hypotheses 1032 for unobserved surfaces based on the captured images, determine missing surface information 1036 from the surface hypotheses, and determine a least impact path 1038 for the UAV based on the missing surface information and desired flight parameters.

According to other examples, the initial movement 340 path may be determined based on user definition or automatic estimation of an outline of the structure 102 to be modeled. The controller 116 may determine a normal vector and a viewing cone 576 for each surface with missing surface information and determine a set of desired locations based on the viewing cones for the entire structure to be modeled 102. Furthermore, a confidence interval may be determined associated with each viewing cone, the confidence interval defining a priority or value of visiting the viewing cone. The controller 116 may also determine the desired locations based on hypothesized surfaces for portions of the structure to be modeled 102 that have not been captured yet. The hypothesized surfaces 470, 472 may be computed employing a Random Sample Consensus Surface Extraction (RANSAC) algorithm. Moreover, the desired flight parameters may include one or more of a total flight time, available UAV power, a noise limitation, and/or a user defined restriction.

The present disclosure further presents a method for controlling a flight path of a UAV based image capture system for solid modeling. The method may include determining an initial movement path 1024 based on an estimate of a structure to be modeled, capturing images of the structure to be modeled 1026, forming surface hypotheses 1032 for unobserved surfaces based on the captured images, and computing a normal vector and a viewing cone 576 for each hypothesized surface 470, 472. According to other examples, the method may further include determining a set of desired locations based on the viewing cones for the entire structure to be modeled and determining a least impact path 1038 for the UAV based on the desired locations and desired flight parameters.

According to further examples, the method may also include computing the viewing cone 576 for each hypothesized surface using the normal vector and a view angle, where the view angle is dynamically determined as a goodness gradient based on the onboard camera's optical capabilities, the UAV's distance to the surface, and lighting conditions such that a goodness parameter for the flight path is optimized. The goodness parameter may represent a quality of captured images of the structure to be modeled 102 and one or more desired flight parameters.

According to yet other examples, the method may include optimizing the goodness parameter employing a multi-dimensional optimization of values algorithm on the goodness gradient and a cost function representing one or more of a total flight time, available UAV power, a noise limitation, and/or a user defined restriction for the UAV. The optimization of values algorithm may be a simulated annealing optimization algorithm. The goodness gradient may also be computed once per travel path 342 for each portion of the structure to be modeled.

The present disclosure also provides a computer-readable storage medium 1102 having instructions 1104 stored thereon for controlling a flight path of an unmanned aerial vehicle (UAV) based image capture system for solid modeling. The examples may include determining an initial movement path 1024 based on an estimate of a structure to be modeled, capturing images of the structure to be modeled 1026, and guiding the flight path 1038. According to further examples, the flight path may be guided by forming surface hypotheses 1032 for unobserved surfaces based on the captured images, computing a normal vector and a viewing cone 576 for each hypothesized surface, determining a set of desired locations based on the viewing cones for the entire structure to be modeled 102, and determining a least impact path for the UAV based on the desired locations and one or more of a total flight time, available UAV power, a noise limitation, and/or a user defined restriction for the UAV.

The instructions may further include dynamically computing a view angle for each viewing cone 576 as a goodness gradient based on an onboard camera's optical capabilities, the UAV's distance to the surface, and lighting conditions such that a goodness parameter for the flight path 798 representing a quality of captured images of the structure to be modeled 102 is optimized. The normal vector may be determined using an average normal from lowest quality data gathered from the captured images.

According to yet further examples, the normal vector for non-planar surfaces may be determined by breaking down surfaces that are previously identified as low quality from a single score into a Voronoi tessellation and assigning each region a similar score. The instructions may also include employing a largest area in a resulting Voronoi diagram with a score below a predefined threshold as the surface for normal vector generation and extending the determined normal vector to define the viewing cone 576 based on an onboard camera's optical capabilities, the UAV's distance to the surface, and lighting conditions.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, materials, and configurations, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control modules (e.g., adjusting image capture parameters or flight parameters of the UAV).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An automatic unmanned aerial vehicle (UAV) flight control system for solid modeling, the system comprising:
    a UAV with an onboard camera;
    a controller capable of communication with a flight control module of the UAV, the controller configured to:
        determine an initial movement path based on an estimate of a structure to be modeled;
        capture images of the structure to be modeled;
        form surface hypotheses for unobserved surfaces based on the captured images;
        determine missing surface information from the surface hypotheses; and
        determine a least impact path for the UAV based on the missing surface information and desired flight parameters.

2. The system according to claim 1, wherein the initial movement path is determined based on one of user definition and automatic estimation of an outline of the structure to be modeled.

3. The system according to claim 1, wherein the controller is further configured to determine a normal vector and a viewing cone for each surface with the missing surface information.

4. The system according to claim 3, wherein the controller is further configured to determine a set of desired locations based on the viewing cones for an entirety of the structure to be modeled.

5. The system according to claim 4, wherein the controller is further configured to determine a confidence interval associated with each viewing cone, the confidence interval defining one of a priority and/or a value of the UAV visiting the viewing cone.

6. The system according to claim 4, wherein the controller is further configured to determine the desired locations based on hypothesized surfaces for portions of the structure to be modeled that have not been captured yet.

7. The system according to claim 6, wherein the hypothesized surfaces are computed employing a Random Sample Consensus Surface Extraction (RANSAC) algorithm.

8. The system according to claim 1, wherein the desired flight parameters include one or more of a total flight time, available UAV power, a noise limitation, and/or a user defined restriction.

9. The system according to claim 1, wherein the controller is part of a remote computing device and is further configured to communicate with the flight control module of the UAV via wireless means.

10. A method to control a flight path of an unmanned aerial vehicle (UAV) based image capture system for solid modeling, the method comprising:
    determining an initial movement path based on an estimate of a structure to be modeled;
    capturing images of the structure to be modeled;
    forming surface hypotheses for unobserved surfaces based on the captured images;
    computing a normal vector and a viewing cone for each hypothesized surface;
    determining a set of desired locations based on the viewing cones for an entirety of the structure to be modeled; and
    determining a least impact path for the UAV based on the desired locations and desired flight parameters.

11. The method according to claim 10, further comprising:
    computing the viewing cone for each hypothesized surface using the normal vector and a view angle.

12. The method according to claim 11, wherein the view angle is dynamically determined as a goodness gradient based on an onboard camera's optical capabilities, a distance of the UAV to the surface, and lighting conditions such that a goodness parameter for the flight path is optimized.

13. The method according to claim 12, wherein the goodness parameter is derived from a quality of data associated with unobserved surfaces of the structure to be modeled.

14. The method according to claim 12, further comprising:
    optimizing the goodness parameter employing a multi-dimensional optimization of values algorithm on the goodness gradient and a cost function representing one or more of a total flight time, available UAV power, a noise limitation, and/or a user defined restriction for the UAV.

15. The method according to claim 14, wherein the optimization of values algorithm is one of a lazy optimization algorithm and a simulated annealing optimization algorithm.

16. The method according to claim 12, wherein the goodness gradient is computed once per travel path for each portion of the structure to be modeled.

17. A computer-readable storage medium with instructions stored thereon to control a flight path of an unmanned aerial vehicle (UAV) based image capture system for solid modeling, the instructions comprising:
    determining an initial movement path based on an estimate of a structure to be modeled;
    capturing images of the structure to be modeled; and
    guiding the flight path by:
        forming surface hypotheses for unobserved surfaces based on the captured images;
        computing a normal vector and a viewing cone for each hypothesized surface;
        determining a set of desired locations based on the viewing cones for an entirety of the structure to be modeled; and
        determining a least impact path for the UAV based on the desired locations and one or more of a total flight time, available UAV power, a noise limitation, and/or a user defined restriction for the UAV.

18. The computer-readable storage medium according to claim 17, wherein the instructions further comprise:
    dynamically computing a view angle for each viewing cone as a goodness gradient based on an onboard camera's optical capabilities, a distance of the UAV to the surface, and lighting conditions such that a goodness parameter for the flight path representing a quality of captured images of the structure to be modeled is optimized.

19. The computer-readable storage medium according to claim 17, wherein the normal vector is determined using an average normal from lowest quality data gathered from the captured images.

20. The computer-readable storage medium according to claim 17, wherein the normal vector is determined for non-planar surfaces by breaking down surfaces that are previously identified as low quality from a single score into a Voronoi tessellation and assigning each region a similar score.

21. The computer-readable storage medium according to claim 20, wherein the instructions further comprise:
    employing a largest area in a resulting Voronoi diagram with a score below a predefined threshold as the surface for normal vector generation; and
    extending the determined normal vector to define the viewing cone based on an onboard camera's optical capabilities, a distance of the UAV to the surface, and lighting conditions.

* * * * *